United States Patent
Goeschl

(10) Patent No.: US 8,826,589 B2
(45) Date of Patent: Sep. 9, 2014

(54) LIGHT SOURCES AND METHODS FOR ILLUMINATING PLANTS TO ACHIEVE EFFECTIVE PLANT GROWTH

(75) Inventor: John Goeschl, Davis, CA (US)

(73) Assignee: BlueSky Grow Lights, LLC, Las Vegas, NV (US)

( * ) Notice: Subject to any disclaimer, the term of this patent is extended or adjusted under 35 U.S.C. 154(b) by 0 days.

(21) Appl. No.: 13/490,106

(22) Filed: Jun. 6, 2012

(65) Prior Publication Data

US 2013/0326945 A1 Dec. 12, 2013

(51) Int. Cl.
*A01G 7/00* (2006.01)
*A01G 7/04* (2006.01)

(52) U.S. Cl.
CPC .................................. *A01G 7/045* (2013.01)
USPC ..................................................... 47/58.1 LS

(58) Field of Classification Search
USPC ............................. 47/58.1 LS; 362/231, 800
See application file for complete search history.

(56) References Cited

U.S. PATENT DOCUMENTS

| | | | |
|---|---|---|---|
| 3,722,137 A * | 3/1973 | Kesinger et al. .................. | 47/87 |
| 5,278,432 A | 1/1994 | Ignatius et al. | |
| 6,042,250 A | 3/2000 | Stragnola | |
| 6,474,838 B2 * | 11/2002 | Fang et al. ..................... | 362/231 |
| 6,921,182 B2 | 7/2005 | Anderson et al. | |
| 7,824,070 B2 * | 11/2010 | Higley et al. ............ | 362/249.02 |
| 8,297,782 B2 * | 10/2012 | Bafetti et al. ................. | 362/231 |
| 2002/0040548 A1 | 4/2002 | Ware | |
| 2006/0006820 A1 | 1/2006 | Roseman et al. | |
| 2007/0058368 A1 | 3/2007 | Partee et al. | |
| 2008/0302004 A1 * | 12/2008 | Lin ........................... | 47/58.1 LS |
| 2009/0199470 A1 | 8/2009 | Capen et al. | |
| 2010/0039804 A1 | 2/2010 | Budde et al. | |
| 2010/0287830 A1 | 11/2010 | Chen et al. | |

(Continued)

FOREIGN PATENT DOCUMENTS

| | | |
|---|---|---|
| JP | 2003-102272 | 4/2003 |
| JP | 2006-012766 | 1/2006 |
| JP | 2010130986 A * | 6/2010 |
| KR | 10-1184631 | 9/2012 |

OTHER PUBLICATIONS

John Goeschl, U.S. Appl. No. 13/490,158, filed Jun. 6, 2012, Entitled "Novel Light Sources and Methods for Illuminating Plants to Achieve Effective Plant Growth", Non-Final Office Action dated Sep. 24, 2013.

(Continued)

*Primary Examiner* — David Parsley
*Assistant Examiner* — Danielle Clerkley
(74) *Attorney, Agent, or Firm* — Ecotech Law Group, P.C.

(57) ABSTRACT

A method of growing a plant or its propagule is described. The method includes: (i) powering a light source with input power to generate an incident light; (ii) illuminating, for a period of time, a growth area of the plant/propagule with the incident light having a spectral profile defined by a first (i.e., between about 400 nm and about 470 nm), a second (i.e., between about 526 nm and about 570 nm) and a third (i.e., between about 626 nm and about 700 nm) set of wavelengths; (iii) achieving, using the incident light, a dry weight that is greater than that achieved if the growth area of the plant/propagule had been illuminated by another incident light with same amount of input power for substantially same period of time, and another incident light includes the first and the third set of wavelengths, but not the second set of wavelengths.

23 Claims, 12 Drawing Sheets

(56) References Cited

U.S. PATENT DOCUMENTS

| 2011/0302839 | A1 | 12/2011 | Senders |
| 2012/0020071 | A1* | 1/2012 | Mckenzie ..................... 362/231 |
| 2012/0043907 | A1 | 2/2012 | Lu et al. |
| 2012/0099305 | A1 | 4/2012 | Bucove |
| 2013/0008085 | A1* | 1/2013 | Aikala et al. ............. 47/58.1 LS |

OTHER PUBLICATIONS

John Goeschl, U.S. Appl. No. 13/490,184, filed Jun. 6, 2012, Entitled "Novel Light Sources and Methods for Illuminating Plants to Achieve Effective Plant Growth", Non-Final Office Action dated Aug. 28, 2013.
John Goeschl, U.S. Appl. No. 13/490,210, filed Jun. 6, 2012, Entitled "Novel Light Sources and Methods for Illuminating Plants to Achieve Effective Plant Growth", Non-Final Office Action dated Jun. 6, 2013.
John Goeschl, U.S. Appl. No. 13/490,158, filed Jun. 6, 2012, Entitled "Novel Light Sources and Methods for Illuminating Plants to Achieve Effective Plant Growth".
John Goeschl, U.S. Appl. No. 13/490,184, filed Jun. 6, 2012, Entitled "Novel Light Sources and Methods for Illuminating Plants to Achieve Effective Plant Growth".
John Goeschl, U.S. Appl. No. 13/490,210, filed Jun. 6, 2012, Entitled "Novel Light Sources and Methods for Illuminating Plants to Achieve Effective Plant Growth".
J. D. Goeschl, H. K. Pratt and B. A. Bonner, "An Effect of Light on the Production of Ethylene and the growth of the Plumular Portion of Etiolated Pea Seedlings," Plant Physiology, 42(8):1077-1088 (1967).
John Goeschl, U.S. Appl. No. 13/490,210, filed Jun. 6, 2012, final office action mailed Nov. 7, 2013.
John Goeschl, U.S. Appl. No. 13/490,184, filed Jun. 6, 2012, Entitled "Novel Light Sources and Methods for Illuminating Plants to Achieve Effective Plant Growth", Non Final Office Action dated Aug. 28, 2013.
John Goeschl, U.S. Appl. No. 13/490,184, filed Jun. 6, 2012, Entitled "Novel Light Sources and Methods for Illuminating Plants to Achieve Effective Plant Growth", Final Office Action dated Dec. 16, 2013.
John Goeschl, PCT Application No. PCT/US2013/044391, International Filing Date: Jun. 5, 2013, International Search Report Mailed Nov. 15, 2013.
John Goeschl, PCT Application No. PCT/US2013/044391, International Filing Date: Jun. 5, 2013, Written Opinion Mailed Nov. 15, 2013.
John Goeschl, U.S. Appl. No. 13/490,158, filed Jun. 6, 2012, Notice of Allowance, Dated Apr. 9, 2014.

\* cited by examiner

LIGHT SOURCES AND METHODS FOR ILLUMINATING PLANTS TO ACHIEVE EFFECTIVE PLANT GROWTH

FIELD OF THE INVENTION

The present invention relates generally to novel light sources and methods for illuminating plants to achieve effective plant growth. More particularly, the present invention relates to light sources and methods for illuminating plants with novel spectral profiles to achieve effective plant growth.

BACKGROUND OF THE INVENTION

Greenhouses, growth chambers, grow boxes and other indoor enclosures (hereinafter collectively referred to as "plant enclosures") provide controlled environments designed to protect germinating seedlings, bulbs, cuttings, or young plants from harsh weather that might otherwise be detrimental to their growth. More than offer protection, such plant enclosures include certain features that allow for optimum plant growth.

A greenhouse is a building made from glass or is a tunnel-shaped structure made from plastic. It houses numerous plants that are typically arranged in an array (i.e., along rows and columns). Above this arrangement, many light sources are suspended such that the light emanating from them is distributed to the plants below. Light incident on these plants provides them with the requisite energy to promote photosynthesis, which is necessary for plant growth. Modern greenhouses also allow other features such as automatic temperature control, ventilation and semi-automatic watering and feeding to optimize plant growth.

In a grow box, one or a few germinating seeds and grow seedlings that are sensitive to harsh environments such as short days, freezing or dry air are grown. As a result, grow boxes may not be as elaborate as modern greenhouses. However, they at a minimum include a single light source to foster plant growth.

A growth chamber provides a more accurately controlled environment than a greenhouse or a grow box and is typically used for research purposes. It may be used in other cases where it is important to have known repeatable environmental factors to grow plants. Typically, young plants, which tend to be sensitive to their environment, are well suited to be grown in growth chambers.

Use of artificial light in plant enclosures has increased over the years for various reasons. These include the need for year round production of small potted flowering plants, exotic flowers, fresh fruits, vegetables, herbs, growth of plant cuttings, bulbs, seeds and other propagules, and early start of bedding plants. In greenhouses supplemental lighting is essential to maintain constant day-lengths, as for example 14 or 16 hours, throughout the year, and to supplement sunlight in order to boost photosynthetic activity where sunlight intensity is low, as for example in northern climates and foggy areas. In growth chambers, grow boxes, and indoor spaces all of the light for plant growth is provided by artificial conventional lighting. This has produced a strong practical interest in the field of artificially illuminating vegetation.

Unfortunately, the use of conventional lamps, including fluorescent lamps, high pressure sodium lamps, and metal halide lamps for artificial illumination during plant growth suffers from a number of drawbacks. By way of example, artificial illumination by conventional lamps result in undesired slow rate of total plant growth or biomass production, low final dry and wet weights of the plants, small numbers and sizes of flowers, fruits, and seeds. Furthermore the plants may be excessively "leggy," that is elongated and spindly so that they may not stand erect, or they do not have the compact appearance demanded by the market.

As another example, the operating expenses of grow lamps used in conventional greenhouses and growth chambers can also be significant because they are not energy efficient. Furthermore, the operating expenses of artificial lighting for plant growth is generally excessive because the light spectra of conventional lamps are not optimized for plant photosynthesis. The largest non-labor cost in the greenhouse production of flowering potted plants, bedding plants, cut flowers and vegetables, especially in coastal and northern growing regions is electrical power for supplemental lighting. By way of example, in one of the several greenhouse operations in California where more than 6000 high pressure sodium lamps ranging from about 400 watts to about 1000 watts are used, the electric bill exceeds $1,000,000 per year.

As yet another example, a significant amount of the energy produced by the light sources and ballasts, used in conventional greenhouses, is needlessly converted to large amounts of heat. To circumvent undesirable overheating inside the greenhouse, additional equipment in the greenhouse is installed to allow for frequent ventilation. The ventilation equipment represents capital costs for the greenhouse nursery and operating the equipment adds to the operating expense of the greenhouse. As a result, light sources used in conventional greenhouses add to its capital cost and operating expenses.

Therefore, what are needed are light sources, which do not encounter the drawbacks encountered by conventional light sources, such as energy inefficiency and insufficient plant biomass production.

SUMMARY OF THE INVENTION

In view of the foregoing, in one aspect, the present invention provides a method of growing a plant or a plant propagule. The method includes: (i) obtaining the plant or the plant propagule and an electrically-powered light source; (ii) powering the electrically-powered light source with an amount of input power to generate an incident light; (iii) illuminating, for a period of time, a growth area of the plant or the plant propagule with the incident light having a spectral profile defined by a first set of wavelengths, a second set of wavelengths and a third set of wavelengths; (iv) achieving, using the incident light, a photosynthetic productivity from the plant or the plant propagule that is greater than that achieved if the growth area of the plant or the plant propagule had been illuminated by another incident light produced using the amount of the input power for substantially the (same) period of time, and the another incident light includes the first set of wavelengths and the third set of wavelengths, but does not include the second set of wavelengths; and (v) wherein the first set of wavelengths includes wavelengths that are between about 400 nm and about 470 nm, the second set of wavelengths includes wavelengths that are between about 526 nm and about 570 nm, and the third set of wavelengths includes wavelengths that are between about 626 nm and about 700 nm.

In this embodiment, the first set of wavelengths preferably includes between about 12% and about 16% of the incident light illuminating the plant or the plant propagule. Furthermore, the second set of wavelengths includes between about 19% and about 25% of the incident light illuminating the plant or the plant propagule. Further still, the third set of wavelengths includes between about 27% and about 35% of the incident light illuminating the plant or the plant propagule.

In one preferred embodiment of the present invention, the electrically-powered light source is at least one member selected from a group consisting of an induction lamp, a light emitting diode ("LED") and a metal halide lamp. In connection with the inventive light sources, the input power may be a value that ranges between about 250 Watts and about 400 Watts. Inventive light sources may be implemented in any plant enclosure, e.g., green house or growth chamber. An operable inventive light source illuminates a growth area inside the plant enclosure. The growth area in a greenhouse may be a value that is between about 2 square meters and about 4 square meters. The growth area in a growth chamber may be a value that is between about 0.75 square meters and about 1.5 square meters.

In certain embodiments of the present invention, for substantially the (same) period of time when the plant is illuminated during plant growth, the value of the photosynthetic productivity achieved using the incident light is a value that is between about 40% and about 200% greater per watt of input power than that achieved using the another incident light, which includes the first set of wavelengths and the third set of wavelengths, but does not include the second set of wavelengths.

In alternate embodiments of the present invention, for substantially the (same) period of time, the value of the photosynthetic productivity achieved using the incident light is between about 100% and about 150% greater per watt of input power than that achieved using the previously mentioned another incident light, which includes the first set of wavelengths and the third set of wavelengths, but does not include the second set of wavelengths.

Inventive spectral profiles may further include a fourth set of wavelengths that includes wavelengths that are between about 471 nm and about 525 nm. The fourth set of wavelengths includes between about 12% and about 17% of the incident light illuminating the plant or the plant propagule.

The inventive spectral profiles may further include a fifth set of wavelengths that includes wavelengths that are between about 571 nm and about 625 nm. The fifth set of wavelengths includes between about 15% and about 21% of the light illuminating the plant or the plant propagule.

In another aspect, the present invention provides another method of growing a plant or a plant propagule. This method includes: (i) obtaining the plant or the plant propagule and an electrically-powered light source; (ii) powering the electrically-powered light source with an amount of input power to generate an incident light; (iii) illuminating, for a period of time, a growth area of the plant or the plant propagule with the incident light having a spectral profile defined by a first set of wavelengths, a second set of wavelengths and a third set of wavelengths; (iv) achieving, using the incident light, a photosynthetic productivity from the plant or the plant propagule that is substantially same as that achieved if the growth area of the plant or the plant propagule had been illuminated by another incident light for substantially the (same) period of time, and the another incident light is generated using a greater amount of the input power than the amount of the input power required to generate the incident and the another incident light includes the first set of wavelengths and the third set of wavelengths, but does not include the second set of wavelengths; and (v) wherein the first set of wavelengths includes wavelengths that are between about 400 nm and about 470 nm, the second set of wavelengths includes wavelengths that are between about 526 nm and about 570 nm, and the third set of wavelengths includes wavelengths that are between about 626 nm and about 700 nm.

In yet another aspect, the present invention provides a yet another method. This method includes: (i) exposing the plant or the plant propagule with natural sun light; (ii) providing supplemental light to the plant or the plant propagule by illuminating the plant or the plant propagule to incident light having a first set of wavelengths, a second set of wavelengths, and a third set of wavelengths; and (iii) wherein the first set of wavelengths includes wavelengths that are between about 400 nm and about 470 nm, the second set of wavelengths includes wavelengths that are between about 526 nm and about 570 nm, and the third set of wavelengths includes wavelengths that are between about 626 nm and about 700 nm.

In one embodiment of the present invention, exposing is carried out for a first period of time and the providing is carried out for a second period of time, and the first period of time and the second period of time add up to a specified day length. The specified day length may be substantially constant over a number of days. The number of days occurs during anytime of a year. The specified day length is preferably between about 12 hours and about 16 hours.

In yet another aspect, the present invention provides a light source for growing a plant or a plant propagule. The light source includes: (i) a power component requiring an amount of input power; (ii) a light-emitting component receiving the input power from the power component for illuminating, for a period of time, a growth area of the plant or the plant propagule with an incident light having a spectral profile defined by a first set of wavelengths, a second set of wavelengths and a third set of wavelengths, the light-emitting component provides a photosynthetic productivity from the plant or plant propagule that is greater than that achieved if the same the growth area of the plant or the plant propagule had been illuminated by another incident light for substantially the period of time, and the another incident light includes the first set of wavelengths and third set of wavelengths, but does not include the second set of wavelengths; and (iii) wherein the first set of wavelengths includes wavelengths that are between about 400 nm and about 470 nm, the second set of wavelengths includes wavelengths that are between about 526 nm and about 570 nm, and the third set of wavelengths includes wavelengths that are between about 626 nm and about 700 nm.

In accordance with one embodiment, the inventive light source is one member selected from a group consisting of an induction lamp, a metal halide lamp and a light emitting diode ("LED"). The first set of wavelengths preferably include between about 12% and about 16% of the incident light illuminating the plant or the plant propagule. The second set of wavelengths preferably include between about 19% and about 25% of the incident light illuminating the plant or the plant propagule. The third set of wavelengths preferably include between about 27% and about 35% of the incident light illuminating the plant or the plant propagule. In preferred embodiments of the present invention, input power is a value that ranges between about 250 Watts and about 400 Watts.

Inventive light sources may be implemented in any plant enclosure, e.g., green house or growth chamber. An operable inventive light source illuminates a growth area inside the plant enclosure. The growth area in a greenhouse may be a value that is between about 2 square meters and about 4 square meters. The growth area in a growth chamber may be a value that is between about 0.75 square meters and about 1.5 square meters.

In certain embodiments of the present invention, for substantially the period of time of illumination during plant growth, the photosynthetic productivity achieved using the incident light is a value that is between about 40% and about 200% greater per watt of the input power than that achieved using the another incident light, which includes the first set of wavelengths and the third set of wavelengths, but does not include the second set of wavelengths. For substantially the period of time of illumination during plant growth, the value of photosynthetic productivity achieved using the incident light is preferably between about 100% and about 150% greater per watt of the input power than that achieved using the another incident light, which includes the first set of wavelengths and the third set of wavelengths, but does not include the second set of wavelengths.

In certain preferred embodiments of the present invention, the spectral profile further includes a fourth set of wavelengths that includes wavelengths that are between about 471 nm and about 525 nm. The fourth set of wavelengths preferably includes between about 12% and about 17% of the incident light illuminating the plant or the plant propagule. In certain other preferred embodiments, the spectral profile further includes a fifth set of wavelengths that includes wavelengths that are between about 571 nm and about 625 nm. The fifth set of wavelengths preferably includes between about 15% and about 21% of the incident light illuminating the plant or the plant propagule.

In yet another aspect, the present invention provides another light source for growing a plant or a plant propagule. The light source includes: (i) a power component requiring an amount of input power; (ii) a light-emitting component receiving the input power from the power component for illuminating, for a period of time, a growth area of the plant or the plant propagule with an incident light having a spectral profile defined by a first set of wavelengths, a second set of wavelengths and a third set of wavelengths, the light-emitting component provides a photosynthetic productivity from the plant or the plant propagule that is substantially same as that achieved if the growth area of the plant or the plant propagule had been illuminated by another incident light for substantially the (same) period of time, and the another incident light is generated using a greater amount of the input power than the amount of the input power required to generate the incident and the another incident light includes the first set of wavelengths and the third set of wavelengths, but does not include the second set of wavelengths; and (iii) wherein the first set of wavelengths includes wavelengths that are between about 400 nm and about 470 nm, the second set of wavelengths includes wavelengths that are between about 526 nm and about 570 nm, and the third set of wavelengths includes wavelengths that are between about 626 nm and about 700 nm.

The light source may be at least one member selected from a group consisting of an induction lamp, a light emitting diode ("LED") and a metal halide lamp, and the amount of the input power of the light source may be between about 250 Watts and about 400 Watts. The amount of the input power of the induction lamp used for generating the incident light may be between about 20% and about 75% of an amount of the input power of a high pressure sodium lamp or a metal halide lamp used for generating the another incident light. Preferably, however, the input power of the induction lamp used for generating the incident light is between about 40% and about 60% of the amount of the input power of the high pressure sodium lamp or the metal halide lamp used for generating the another incident light.

In certain embodiments of the present invention, the spectral profile further includes a fourth set of wavelengths that include wavelengths between about 471 nm and about 525 nm. The fourth set of wavelengths preferably includes between about 12% and about 15% of the incident light illuminating the plant or the plant propagule. In certain other embodiments of the present invention, the spectral profile further includes a fifth set of wavelengths that includes wavelengths that are between about 571 nm and about 625 nm. The fifth set of wavelengths preferably includes between about 15% and about 21% of the incident light illuminating the plant or the plant propagule.

In yet another aspect the present invention provides a yet another method of growing a plant or a plant propagule. The method includes: (i) obtaining the plant or the plant propagule and an electrically-powered light source; (ii) powering the electrically-powered light source with an amount of input power to generate an incident light; (iii) illuminating, for a period of time, a growth area of the plant or the plant propagule with the incident light having a spectral profile defined by a first set of wavelengths, a second set of wavelengths and a third set of wavelengths; (iv) achieving, using the incident light, a final harvest index from the plant or the plant propagule that is greater than that achieved if the growth area of the plant or the plant propagule had been illuminated by another incident light with the amount of input power for substantially the period of time, and the another incident light includes the first set of wavelengths and the third set of wavelengths, but does not include the second set of wavelengths; and (v) wherein the final harvest index refers to a ratio of dry weight of harvestable plant components to total dry weight of the plant, and wherein the first set of wavelengths includes wavelengths that are between about 400 nm and about 470 nm, the second set of wavelengths includes wavelengths that are between about 526 nm and about 570 nm, and the third set of wavelengths includes wavelengths that are between about 626 nm and about 700 nm.

In one embodiment of the present invention, the above-mentioned another incident light is generated by a high pressure sodium lamp or a metal halide lamp powered by the amount of input power. In preferred embodiments of the present invention, final harvest index includes at least one member selected from a group consisting of number of flowers, number of fruits, number of seeds, and number flower buds produced by the plant or the plant propagule.

In accordance with one embodiment of the present invention, the first set of wavelengths includes between about 12% and about 16% of the incident light illuminating the plant or plant propagule. Furthermore in this embodiment, the second set of wavelengths is between about 19% and about 25% of the incident light illuminating the plant or the plant propagule. Further still, in this embodiment, the third set of wavelengths includes between about 27% and about 35% of the incident light illuminating the plant or the plant propagule.

In certain preferred embodiments of the present invention, the electrically-powered light source is one member selected from a group consisting of an induction lamp, a metal halide lamp and a light-emitting diode ("LED"). The light source requires an input power, which is a value that ranges between about 250 Watts and about 400 Watts.

The above-mentioned period of time is a value that is between about 12 weeks and about 16 weeks. In certain embodiments of the present invention, for substantially the period of time of illumination during plant growth, the harvest index achieved using the incident light is a value that is between about 40% and about 120% greater per watt of the input power than that achieved using the another incident light, which includes the first set of wavelengths and the third set of wavelengths, but does not include the second set of wavelengths. For substantially the period of time of illumination during plant growth, the value of harvest index achieved using the incident light is preferably between about 80% and about 120% greater per watt of the input power than that achieved using the another incident light, which includes the first set of wavelengths and the third set of wavelengths, but does not include the second set of wavelengths.

In certain preferred embodiments of the present invention, the spectral profile further includes a fourth set of wavelengths that includes wavelengths that are between about 471 nm and about 525 nm. The fourth set of wavelengths preferably includes between about 12% and about 17% of the incident light illuminating the plant or the plant propagule. In certain other preferred embodiments, the spectral profile further includes a fifth set of wavelengths that includes wavelengths that are between about 571 nm and about 625 nm. The fifth set of wavelengths preferably includes between about 15% and about 21% of the incident light illuminating the plant or the plant propagule.

In yet another aspect, the present invention provides a method of growing a plant or plant propagule. The method includes: (i) obtaining the plant or the plant propagule and an electrically-powered light source; (ii) powering the electrically-powered light source with an amount of input power to generate an incident light; (iii) illuminating, for a period of time, a growth area of the plant or the plant propagule with the incident light having a spectral profile defined by a first set of wavelengths, a second set of wavelengths and a third set of wavelengths; (iv) achieving, using the incident light, a final harvest index from the plant or the plant propagule that is substantially same as that achieved if the growth area of the plant or the plant propagule had been illuminated by another incident light for substantially the period of time, and the another incident light is generated using a greater amount of the input power than the amount of the input power required to generate the incident and the another incident light includes the first set of wavelengths and the third set of wavelengths, but does not include the second set of wavelengths; and (v) wherein the final harvest index refers to a ratio of dry weight of harvestable plant components to total dry weight of the plant, and wherein the first set of wavelengths includes wavelengths that are between about 400 nm and about 470 nm, the second set of wavelengths includes wavelengths that are between about 526 nm and about 570 nm, and the third set of wavelengths includes wavelengths that are between about 626 nm and about 700 nm.

In accordance with preferred embodiments of the present invention, the light source is at least one member selected from a group consisting of an induction lamp, a light emitting diode ("LED") and a metal halide lamp, and the amount of the input power of the light source is between about 250 Watts and about 400 Watts. The amount of the input power used for generating the incident light is between about 20% and about 75% of an amount of the input power used for generating the another incident light. The amount of the input power used for generating the incident light is between about 40% and about 60% of the amount of the input power used for generating the another incident light.

In certain preferred embodiments of the present invention, the spectral profile further includes a fourth set of wavelengths that includes wavelengths that are between about 471 nm and about 525 nm. The fourth set of wavelengths preferably includes between about 12% and about 17% of the incident light illuminating the plant or the plant propagule. In certain other preferred embodiments, the spectral profile further includes a fifth set of wavelengths that includes wavelengths that are between about 571 nm and about 625 nm. The fifth set of wavelengths preferably includes between about 15% and about 21% of the incident light illuminating the plant or the plant propagule.

The construction and method of operation of the invention, however, together with additional objects and advantages thereof, will be best understood from the following descriptions of specific embodiments when read in connection with the accompanying figures.

DETAILED DESCRIPTION OF THE PREFERRED EMBODIMENTS

In the following description numerous specific details are set forth in order to provide a thorough understanding of the present invention. It will be apparent, however, to one skilled in the art that the present invention may be practiced without limitation to some or all of these specific details. In other instances, well known process steps have not been described in detail in order to not unnecessarily obscure the invention.

Figure 1:
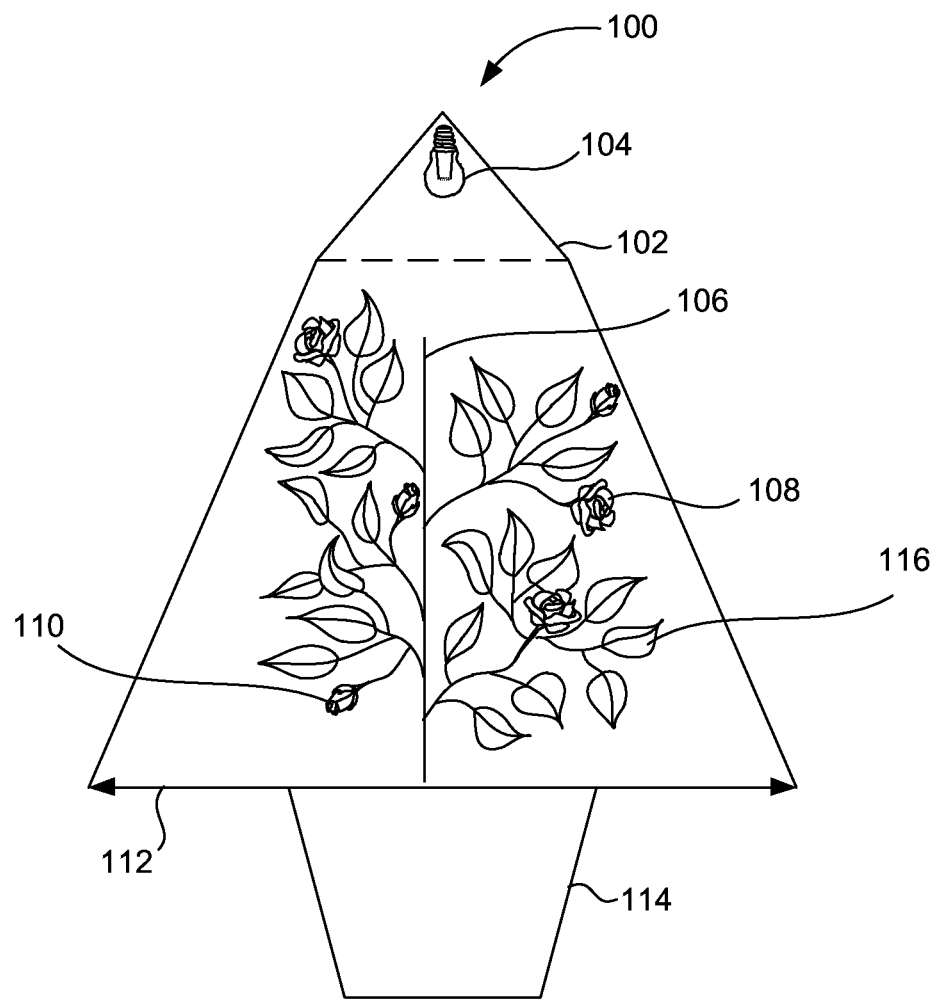
FIG. 1 shows a light source for illuminating a plant as is typically found in a plant enclosure.

FIG. 1 shows an arrangement 100 of a plant 106 growing in a growth chamber 102 under a light source 104. Light source 104 illuminates a grow area 112, which encompasses plant 106 growing out of a pot 114. Plant 106 includes leaves 116, flowers 108 and buds 110. Instead of growing plant 106 as shown in FIG. 1, the present invention recognizes that a plant propagule (e.g., seeds, spores, cuttings, bulbs, corns and rhizomes) may be similarly germinated in pot 114 under light source 104.

Figure 2:
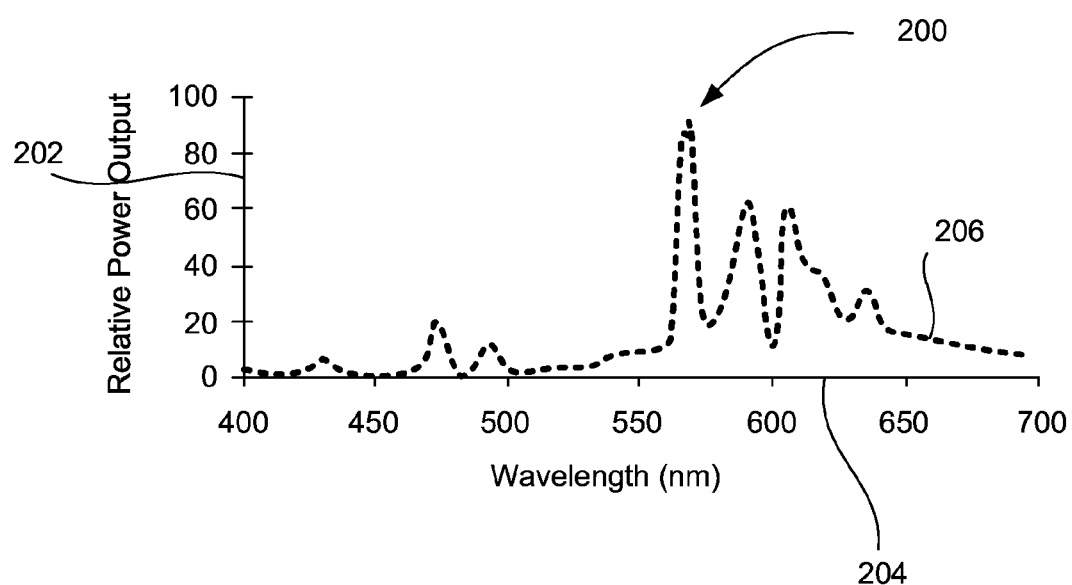
FIG. 2 is a graphical representation which shows a relative power output of a conventional spectrum obtained from a high pressure sodium (HPS) lamp versus the different wavelengths being emitted from the lamp.

FIG. 2 is a graphical representation 200 of values of relative power output of a conventional HPS spectrum 206 plotted along y-axis 202 versus the different wavelengths being emitted from the lamp plotted against x-axis 204. In other words, if light source 104 of FIG. 1 was an HPS lamp, conventional light spectrum 206 of FIG. 2 energizes plant 106 of FIG. 1 or a plant propagule for germination.

According to FIG. 2 and as is well known in the art, conventional HPS light spectrum 206 illuminates plant 106 with a relatively larger intensity of yellow (i.e., about 550 nm to about 575 nm), orange (i.e., about 576 nm to about 625 nm), a relatively smaller intensity of red (i.e., about 626 nm to about 700 nm) wavelengths and a relatively smaller intensity of blue (i.e., about 450 nm to about 475 nm) and cyan (i.e., about 476 nm to about 500 nm) wavelengths.

Figure 3:
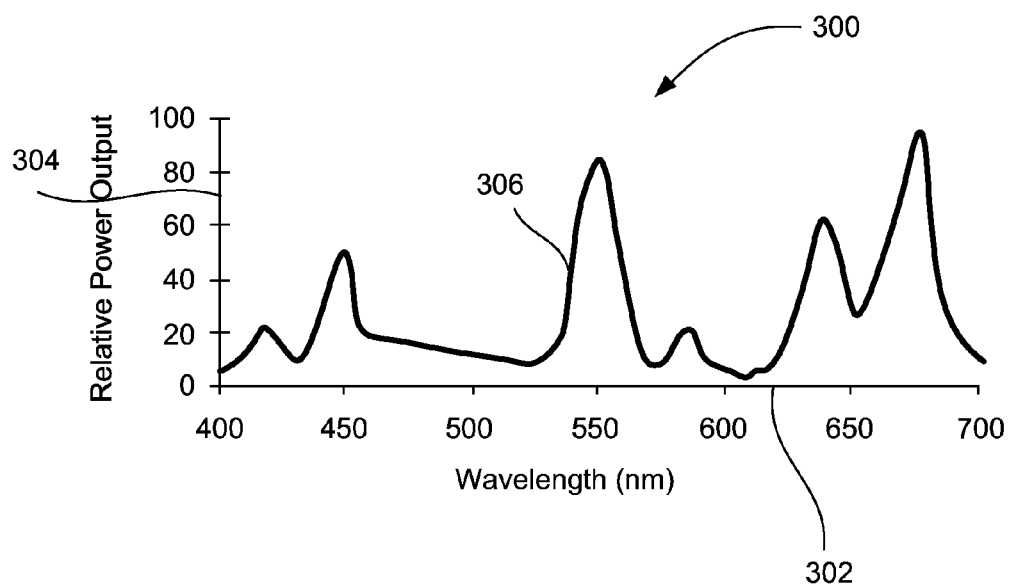
FIG. 3 is a graphical representation which shows a relative power output of an enhanced photosynthetic spectrum ("EPS"), in accordance with one embodiment of the present invention, that the present invention expects to obtain from an induction lamp versus the different wavelengths present in the EPS.

FIG. 3 is a graphical representation 300, according to one embodiment of the present invention, of relative power output of an EPS 306 plotted along y-axis 302, versus different wavelengths in EPS 306 plotted along x-axis 304. In this figure, the different wavelengths of EPS 306 shown are expected from an induction lamp's emission. If plant 106 of FIG. 1 or a plant propagule is germinated using EPS light from an inductive lamp, then the plant is exposed to indigo and blue wavelengths that span from about 400 nm to about 470 nm, green wavelengths (i.e., about 525 nm to about 570 nm), and a combination of yellow, orange and red wavelengths that span from about 625 nm to about 700 nm. Proper phosphor formulations, which are well known to those skilled in the art, provide different constituent wavelengths of EPS light and are preferably used in the manufacture of induction lamps of the present invention. To generate values shown in FIG. 3, a spectro-radiometer, Orb Optronix SP-11, commercially available from Kirkland, Wash., should work well. Spectro-radiometer represents a preferred means to measure the intensity of constituent EPS wavelengths because the same instrument is capable of both separating the EPS light into very narrow wavelength bands (of approximately 1.5 nm) and also measuring the intensity of each wavelength band.

Figure 4:
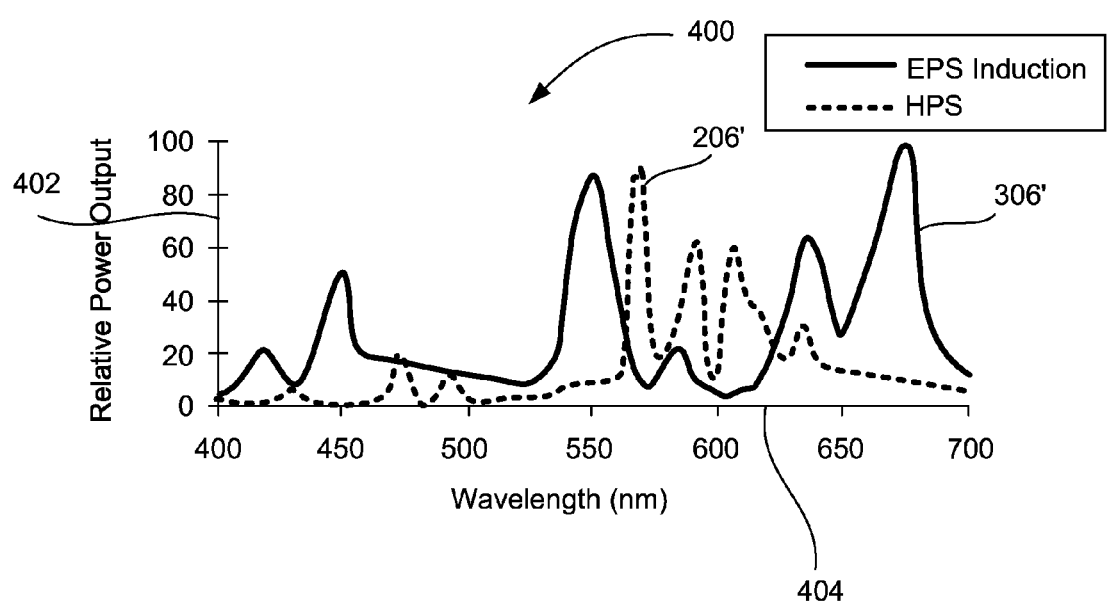
FIG. 4 shows a comparison between the graphical representations shown in FIGS. 2 and 3.

FIG. 4 shows a comparison 400 of the graphical representations of conventional HPS spectrum 206' shown in FIG. 2 and EPS 306' shown in FIG. 3. Plotted against y-axis 402 is the relative power output of a conventional and EPS obtained from an HPS lamp and expected to obtain from an induction lamp, respectively, and plotted along x-axis 404 are the different wavelengths being emitted from these lamps. According to this figure, EPS, according to one embodiment of the present invention, includes indigo and green wavelengths that are not found in the conventional HPS spectrum. Furthermore, to the extent blue and red wavelengths, present in EPS, are found in the conventional spectrum, they are not present in the conventional HPS spectrum in the relatively large amounts they are present in the EPS.

In accordance with one embodiment, inventive light sources that emit an incident light including EPS and that are used for growing a plant or a plant propagule, are electrically-powered. EPS has a spectral profile defined by a first set of wavelengths, a second set of wavelengths and a third set of wavelengths. In preferred embodiments of the inventive EPS, the first set of wavelengths includes wavelengths that are between about 400 nm and about 470 nm, the second set of wavelengths includes wavelengths that are between about 526 nm and about 570 nm, and the third set of wavelengths includes wavelengths that are between about 626 nm and about 700 nm. In this embodiment, the first set of wavelengths comprise between about 12% and about 16% of incident light illuminating the plant or the plant propagule, the second set of wavelengths includes comprise between about 19% and about 25% of incident light illuminating the plant or the plant propagule, and the third set of wavelengths comprise between about 27% and about 35% of incident light illuminating the plant or the plant propagule.

In other preferred embodiments of the present invention, EPS includes a fourth set of wavelengths that are between about 471 nm and about 525 nm and comprise between about 12% and about 17% of incident light illuminating the plant or the plant propagule, and a fifth set of wavelengths includes wavelengths that are between about 571 nm and about 625 nm and comprise between about 15% and about 21% of incident light illuminating the plant or the plant propagule.

Figure 5:
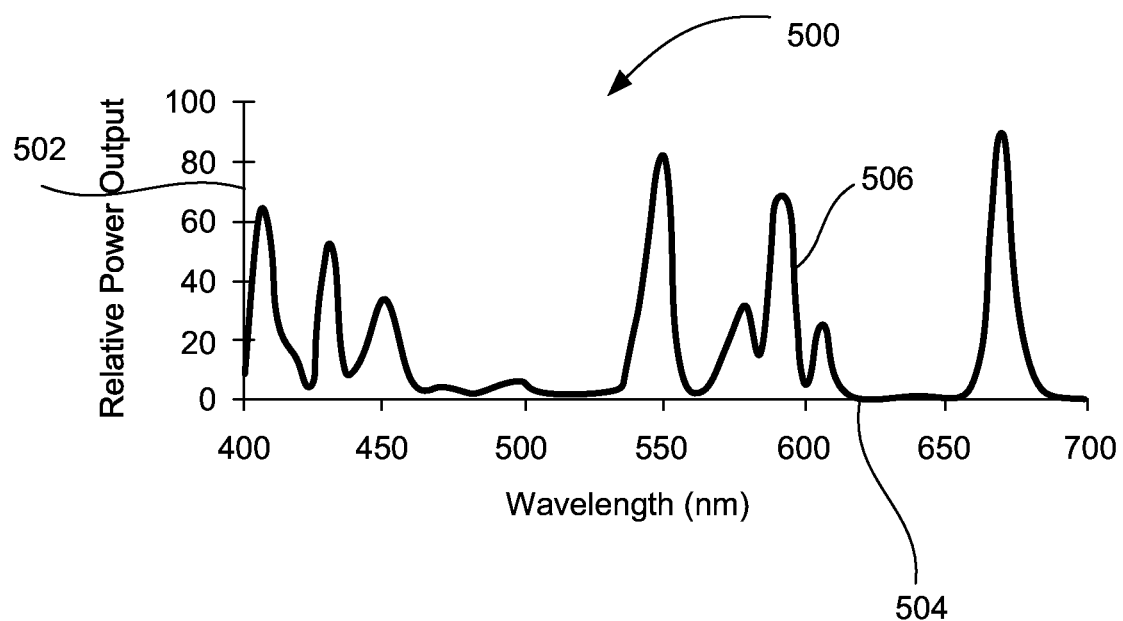
FIG. 5 is a graphical representation which shows a relative power output of an EPS, according to another embodiment of the present invention, obtained from a metal halide ("MH") lamp versus the different wavelengths present in the EPS.

FIG. 5 shows a graphical representation of EPS 506, according to another embodiment of the present invention, obtained from a metal halide ("MH") lamp. In this figure, relative power output of an MH lamp is plotted along y-axis 502 and the different wavelengths being emitted from the lamp are plotted along x-axis 504. EPS 506 obtained from an MH lamp includes indigo, blue, green and red wavelengths in pronounced amounts, as shown in FIG. 5. Similar to induction lamps, MH lamps designed to emit EPS light may be made from appropriate formulations well known to those skilled in the art. Furthermore, in addition to induction and MH lamps, EPS may similarly be obtained from light-emitting diodes ("LEDs") by combining different LEDs that emit the desired wavelengths and of the requisite intensity.

MH lamps are known to be cheaper than induction lamps. In certain embodiments of the present invention, low capital costs associated with MH lamps make them desirable over induction lamps. However, MH lamps are not electronically as efficient as induction lamps, i.e., to obtain a desired amount of illuminating light, power requirements for induction lamps are lower than for MH lamps. Furthermore, MH lamps suffer from a higher failure rate compared to induction lamps and induction lamps enjoy relatively longer life spans than MH lamps. Further still, amount of light and EPS obtained from induction lamps is more reproducible than those obtained from MH lamps. As a result, according to the present invention, induction lamps are desirable over MH lamps.

Regardless of whether an MH lamp or an induction lamp is used for germinating plants, EPS (e.g., EPS 306 of FIG. 3 and EPS 506 of FIG. 5) of the present invention provides advantages not realized by conventional spectrum (spectrum 206 of FIG. 6), which may be obtained from an HPS lamp. By way of example, much higher photosynthetic productivity is obtained from EPS of the present invention than from the conventional spectrum. "Photosynthetic productivity," as that term is used in the specification, refers broadly to the gain in plant biomass resulting from photosynthesis. Photosynthetic productivity encompasses gain in dry weight, leaf area and flower number. Dry weight refers to the weight of the plant after it has been dried such that it is substantially free of moisture. Leaf area refers to the total area of all the leaves on the plant. Flower number simply refers to number of flowers per plant. Another term related to photosynthetic productivity is "harvest index." Harvest index refers to the ratio of the harvestable part of a plant (e.g., fruit, flowers and buds) to the non-harvestable part of the plant. In addition to different measures of photosynthetic productivity, measurement of carbon dioxide exchange rate ("CER"), i.e., includes net $CO_2$ exchange rate and transpiration (which refers to net water vapor loss), also provides insight into photosynthetic productivity. EPS light of the present invention offers advantages that are completely independent of plant growth parameters, such as photosynthetic productivity. By way of example and as will be explained later, EPS light increases the inherent lamp efficiency. In other words, a light source emitting EPS requires less input power than lamps emitting conventional spectrum to achieve the same values of plant growth parameters.

In certain embodiments, the present invention provides plant enclosures, each of which includes one or more inventive light sources. At least one light source inside the plant enclosure emits EPS light and is described herein. Examples of plant enclosures contemplated by the present invention include a greenhouse, a growth chamber, a grow box and an indoor enclosure. To measure impact of different light sources (emitting different types of illuminating spectrums) on photosynthetic productivity, two plants—*Pharbitis nil* (hereinafter "Pharbitis" and commonly known as Japanese Morning Glory) and *Ricinus communis* (commonly known as and hereinafter "Castor Bean") were grown in growth chambers, as detailed below. Seeds of each of these plants were soaked for 24 hours and planted in a 1:1:1 mixture of Vermiculite, coarse sand, and Turface with 1% volume of Osmocote® nutrient pellets in plastic containers, which were about 3 inches in diameter and about 9 inches tall with perforations for drainage at the bottom. The plastic containers were placed inside growth chambers having dimensions of about 24 inches wide, about 24 inches long and about 48 inches deep. Inside these growth chambers, plants sprouting of the speeds were illuminated for 14 hours per day with either a 400 Watt HPS lamp or a 400 Watt MH lamp having an inventive EPS light emission. Each lamp illuminated about 0.6 $m^2$ of grow area (e.g., grow area 112 of FIG. 1). Each lamp inside its associated growth chamber was positioned at a distance above the plants so that the plants were illuminated by light having a value of 350 $\mu Mol/m^2/sec$ photosynthetic photon flux density ("PPFD"), as measured by a Photosynthetically Active Radiation ("PAR") meter located at or near the top of the plants. The PAR meter uses a thermopile to uniformly integrate a total Photosynthetic Photon Flux Densities (PPFD), which are expressed as $\mu mole$ of photons/$m^2$/second, for wavelengths between about 400 nm and about 700 nm. The present invention recognizes that "PAR" is defined as the spectral range of radiation from about 400 nm to about 700 nm and that photosynthetic organisms are able to use in the process of photosynthesis. However, implicit in this definition is the assumption that the photosynthetic process is uniformly sensitive to the different wavelengths across this spectrum. EPS light of the present invention offers advantages that are completely independent of plant growth parameters, such as photosynthetic productivity. By way of example and as will be explained later, EPS light increases the inherent lamp efficiency. In other words, a light source emitting EPS requires less input power than lamps emitting conventional spectrum to achieve the same values of plant growth parameters.

The plants were moved downward as they grew so that the desired PPFD value was maintained. The chambers were maintained at 28° C. during the day and 23° C. at night with a humidity of approximately 60%. The plants were automatically irrigated with water filtered through reverse osmosis three times per day with amounts sufficient to cause some drainage during each irrigation cycle.

Figure 6:
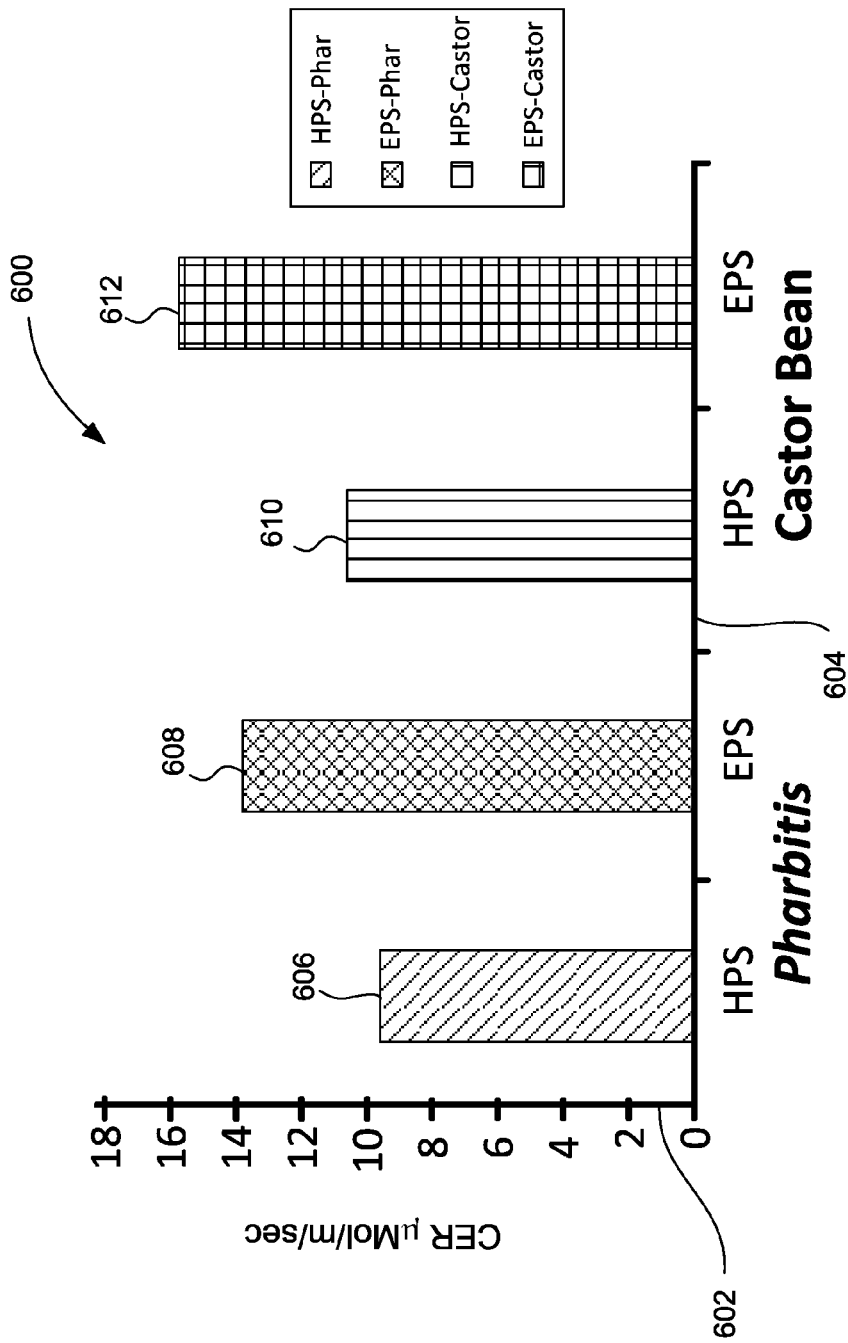
FIG. 6 is a bar graph comparing the photosynthetic carbon exchange rate ("CER") of the third fully mature leaves of Japanese Morning Glory (*Pharbitis nil*) and Castor Bean (*Ricinus communis*) plants grown in growth chambers illuminated with a photosynthetic active radiation ("PAR") of about 350 PAR units of EPS light obtained from an MH lamp and about 350 PAR units of conventional spectrum light obtained from an HPS lamp under the same temperature and humidity as the MH lamp.

Values of CER shown in FIG. 6 measured by a CIRAS I Infrared Gas Analyzer ("IRGA"), which is commercially available from PP Systems International Inc. of Amesbury, Mass. ("PP Systems"). The IRGA was coupled to an automatic type cuvette, which accommodated a flow of 200 cc/min, while maintaining an input of 385 ppm of $CO_2$ and continuously measured the value of PAR. The cuvette aperture enclosed about 3.3 $cm^2$ near the tip of the third true leaf of each plant. The Photosynthetic cuvette was placed at a level to retrieve light intensity of 350 PAR for each lamp as measured by a cuvette PAR meter. It is noteworthy that although not necessary, photosynthetic CER measurements were carried out for a particular plant using the same light source that was used for growing that plant.

FIGS. 6-9 provide photosynthetic productivity measurements for Pharbitis and Castor Bean grown as described above. FIG. 6 shows a bar graph 600 of photosynthetic CER for these plants. Values for CER are plotted along y-axis 602 and have units of $\mu mol$ of $CO_2/m^2/sec$ and the different lamps (i.e., HPS and MH lamps) used for growing Pharbitis and Castor Bean are indicated along x-axis 604. Bars 606 and 610 convey amounts of CER realized from an HPS lamp for Pharbitis and Castor Bean and bars 608 and 612 convey amounts of CER realized from an MH lamp for the same plants, respectively. For Pharbitis, bar 606 shows that when this plant is grown using an HPS, it has a photosynthetic CER of about 9.9 $\mu mol$ of $CO_2/m^2/sec$. In comparison, bar 608 shows that the same type of plant grown under EPS, produced from an MH lamp, has a photosynthetic CER of about 14 $\mu mol$ of $CO_2/m^2/sec$. Similarly, for Castor Bean, bar 610 shows that when this plant is grown under HPS, it has a photosynthetic CER of about 11 $\mu mol$ of $CO_2/m^2/sec$. In comparison, bar 612 shows that the same type of plant grown under EPS, produced from an MH lamp, has a photosynthetic CER of about 16 $\mu mol$ of $CO_2/m^2/sec$. Thus, for growing both Pharbitis and Castor Bean, it is evident that EPS realizes between about 40% and about 45% greater photosynthetic CER than using conventional light sources under the same growing conditions and for a 350 PAR unit.

The present invention also establishes that it is advantageous to use EPS light, as opposed to conventional spectrum light, for purposes of supplemental lighting during plant growth. In an experiment relating to affect of supplemental lighting on plant growth, a measurement of photosynthesis was made at about 350 PAR using a halogen lamp, also available from PP Systems. This lamp emits a spectrum similar to natural sun light. The halogen lamp, serving as the primary light source, was attached to the cuvette and provided insight into the plants performance under natural light. The plants (6 total for each species) were grown in two batches of 3 plants each and the results were totaled and averaged as discussed below. Results from the measurement of photosynthesis using the halogen lamp show that plants grown under supplemental EPS light, as opposed to supplemental light from an HPS lamp, enjoyed about 20% higher photosynthetic CER. As a result, plants grown in greenhouses using a supplemental light source, which emits EPS light rather than conventional spectrum light, realized enhanced photosynthesis and growth under natural sun light and supplemental EPS light over their counterparts grown under natural sun light and supplemental conventional spectrum light.

Figure 7:
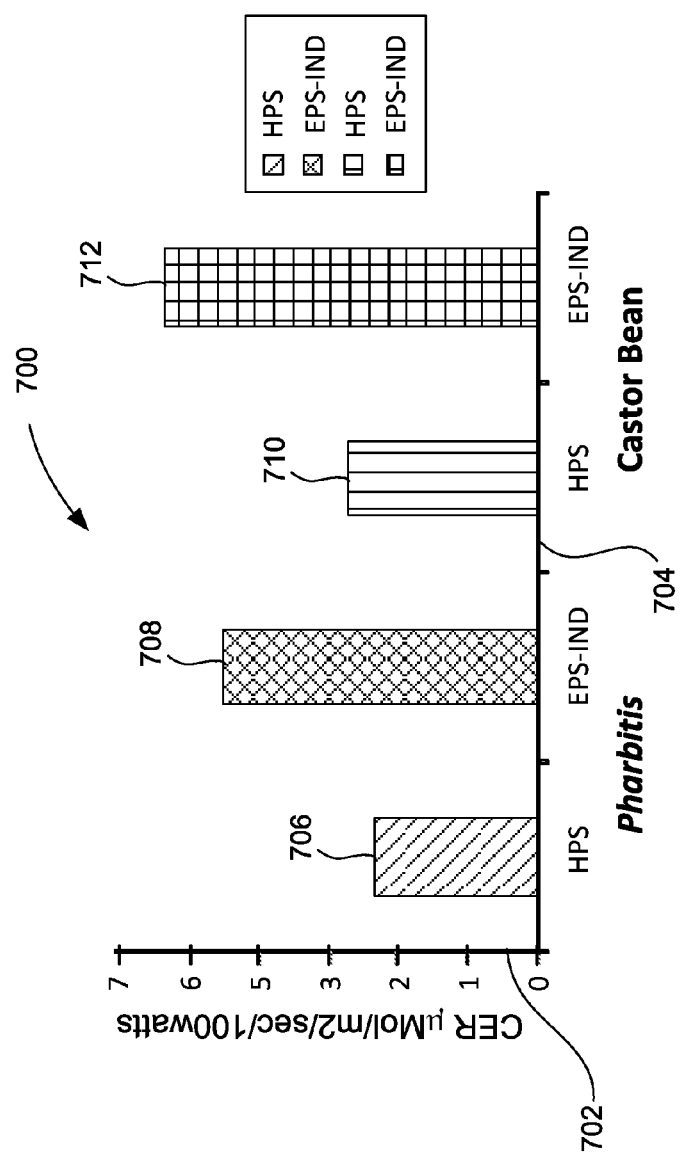
FIG. 7 is a bar graph similar to that shown in FIG. 6, except in FIG. 7, normalized CER values (i.e., per 100 watts of power) expected from an induction lamp are plotted along the y-axis.

FIG. 7 is a bar graph similar to that shown in FIG. 6, except in FIG. 7, normalized CER (i.e., per 100 Watts of power) are plotted along y-axis 702. Furthermore, FIG. 7 presents normalized CER values expected from an induction lamp (instead of a MH lamp as shown in FIG. 6) that is designed to provide EPS light. Calculation of the plotted CER values is described below in greater detail. X-axis 704 of FIG. 7 is substantially similar to x-axis 604 of FIG. 6.

According to FIG. 7, when an HPS lamp, which emits conventional spectrum, is used, bar 706 shows that a normalized CER value of about 2.4 µmol of $CO_2/m^2$/sec/100 Watts is obtained for Pharbitis and bar 710 shows a normalized CER value of about 3 µmol of $CO_2/m^2$/sec/100 Watts is obtained for Castor Bean. Normalized CER values for bars 706 and 710 are obtained by dividing the CER values of corresponding bars 606 and 610 by four 4 so that the resulting values are expressed per 100 Watts of power.

When an induction lamp is used for plant or plant propagule growth, bar 708 shows that a normalized CER value of about 5.56 µmol of $CO_2/m^2$/sec/100 Watts is expected for Pharbitis, and bar 712 shows that a normalized CER value of about 6.5 µmol of $CO_2/m^2$/sec/100 Watts is expected for Castor Bean. These values are arrived at by generating normalized CER values (i.e., by dividing the CER values of corresponding bars 608 and 612 by four 4 so that the resulting CER values are expressed per 100 Watts of power), and then multiplying the normalized CER values by (400/250). A factor of (400/250) is used because the present invention assumes that for the same distance between an EPS light source and a plant or a plant propagule, an MH lamp, which uses 400 Watts of input power, illuminates with substantially similar PAR value as that achieved with an induction lamp that uses 250 Watts of input power. As a result, based on CER values measured using an HPS and an MH (emitting EPS light) lamp, the present invention uses linear interpolation techniques to obtain CER values expected from an induction lamp (emitting EPS light).

The present invention recognizes that for growing both, Pharbitis and Castor Bean, EPS light from an induction lamp offers between about 100% and about 130% greater photosynthetic CER than using conventional light sources under the same growing conditions per Watt of electricity required to power the two different types of lamps.

In summary, these results show that EPS from each of an induction and metal halide lamps substantially increases the photosynthetic rate compared to a conventional HPS lamp at the same Watts of electrical input used. Thus, different embodiments of the present invention demonstrate substantially greater energy efficiency compared to a conventional HPS lamp, and ultimately provides the practical advantage of reduced energy costs when used in greenhouse or growth chamber applications.

Figure 8:
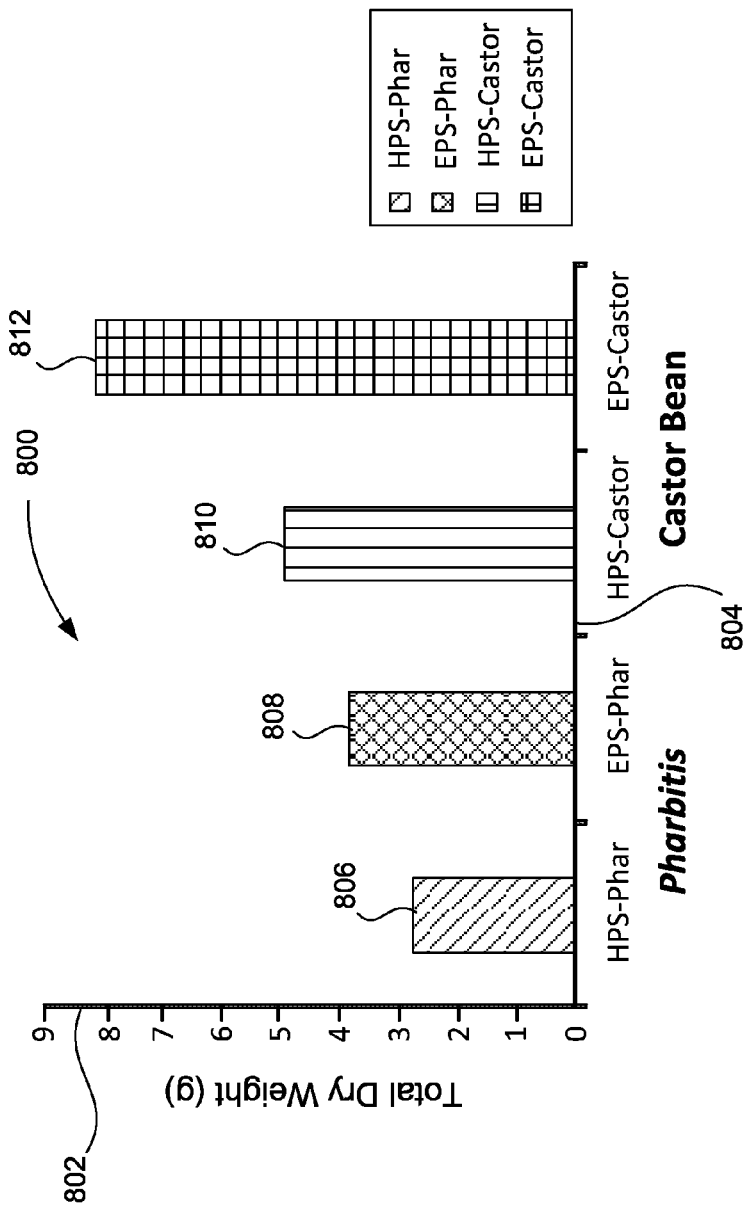
FIG. 8 is a bar graph comparing the dry weight of Pharbitis and Castor Bean plants grown in growth chambers illuminated with a photosynthetic active radiation ("PAR") of about 350 PAR units of EPS light obtained from an MH lamp and about 350 PAR units of conventional spectrum light obtained from an HPS lamp under the same temperature and humidity as the MH lamp.

FIG. 8 shows a bar graph 800, in which values for total dry weight (in grams) of Pharbitis and Castor Bean are plotted along y-axis 802 and the different lamps (i.e., HPS and MH lamps) used for growing these plants are indicated on x-axis 804. Bars 806 and 810 convey amounts of total dry weight obtained from Pharbitis and Castor Bean grown using an HPS lamp and bars 808 and 812 convey amounts of total dry weight obtained from Pharbitis and Castor Bean grown using an MH lamp.

With regard to FIG. 8, for Pharbitis, bar 806 shows that when this plant is grown under HPS, it has a total dry weight of about 2.9 grams. In comparison, bar 808 shows that the same type of plant grown under EPS, produced from an MH lamp, has a total dry weight of about 3.8 grams. Similarly, for Castor Bean, bar 810 shows that when this plant is grown under HPS, it has a total dry weight of about 4.9 grams. In comparison, bar 812 shows that the same type of plant grown under EPS, produced from an MH lamp, has a total dry weight of about 8.5 grams. Thus, for growing both Pharbitis and Castor Bean, it is evident that EPS realizes between about 31% and about 73% greater total dry weight than using conventional light sources under the same growing conditions and for a 350 PAR unit.

Figure 9:
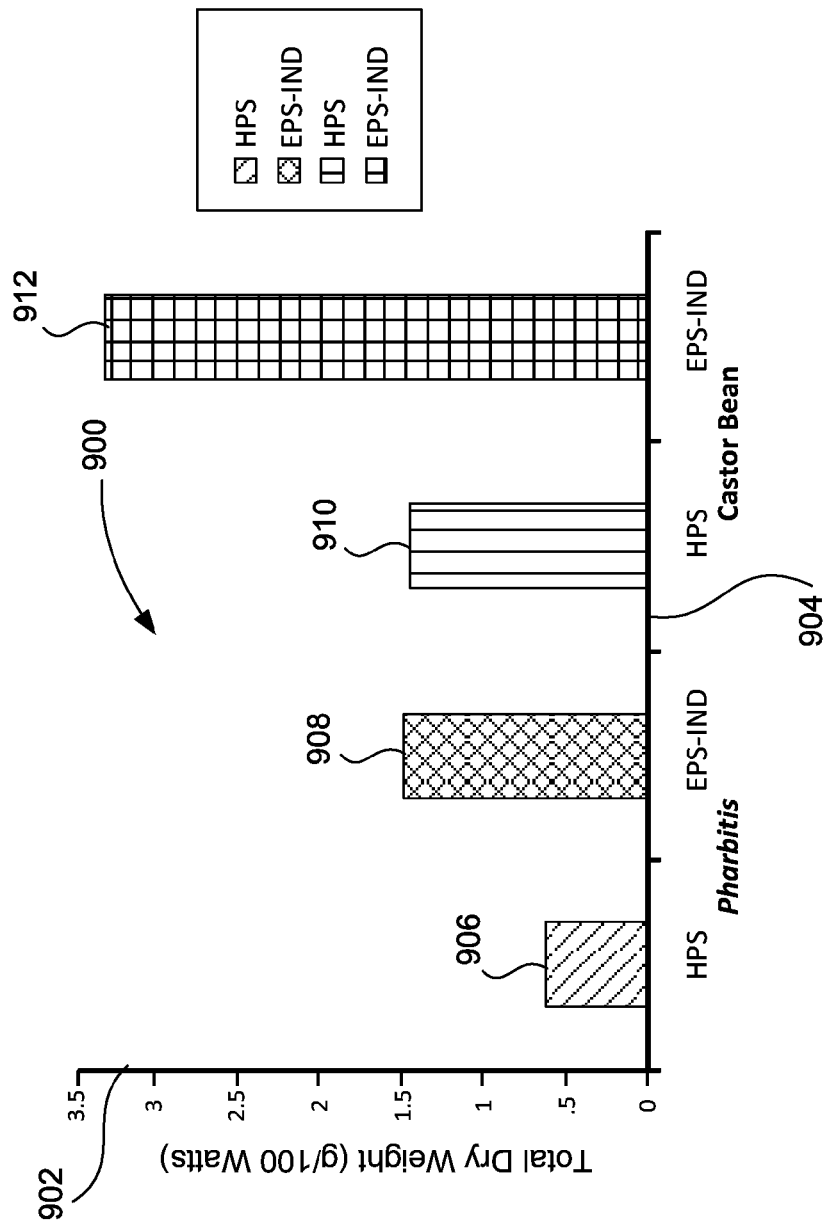
FIG. 9 is a bar graph similar to that shown in FIG. 8, except in FIG. 9, normalized dry weight values (i.e., per 100 watts of power) expected from an induction lamp are plotted along the y-axis.
Figure 10:
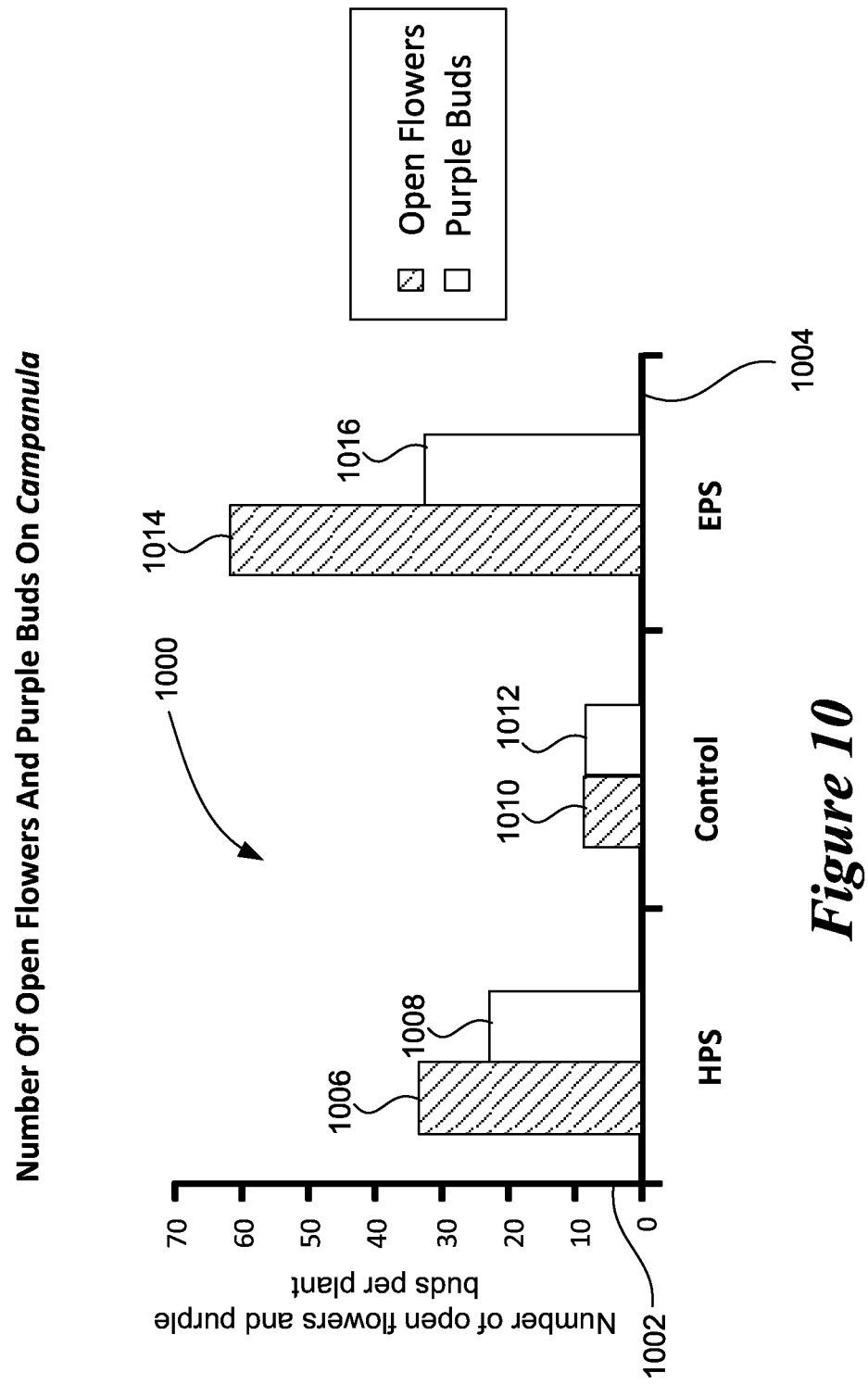
FIG. 10 is a bar graph is a bar graph comparing the number of open flowers and purple buds per a Bellflower (*Campanula*) plant that are produced in a greenhouse with six hours of supplemental illumination with a photosynthetic active radiation ("PAR") of about 180 PAR units under the same temperature and humidity but, two different lighting conditions, i.e., a supplementary EPS obtained from a MH lamp and a supplementary conventional spectrum obtained from an HPS lamp; number of flowers obtained from these two light sources were compared to that obtained from a control, which did not receive any supplementary lighting, but was grown in substantially similar temperature and humidity conditions as the other two light sources.

FIG. 9 is a bar graph similar to that shown in FIG. 8, except in FIG. 9, normalized values of total amount of dry weight (i.e., per 100 Watts of power) are plotted along y-axis 902. Furthermore, FIG. 9 presents normalized values expected from an induction lamp (instead of a MH lamp as shown in FIG. 8) that is designed to provide EPS light. X-axis 904 of FIG. 9 is substantially similar to x-axis 804 of FIG. 8.

According to FIG. 9, when an HPS lamp, which emits conventional light spectrum, is used, bar 906 shows that total amount of dry weight of about 0.6 grams/100 Watts is obtained for Pharbitis and bar 910 shows a normalized CER value of about 1.5 grams/100 Watts is obtained for Castor Bean. Normalized values of total amount of dry weight for bars 906 and 910 are obtained by dividing the values of corresponding bars 806 and 810 by four 4 so that the resulting values are expressed per 100 Watts of power.

When Pharbitis is grown using an induction lamp, bar 908 shows that a total amount of dry weight of about 1.5 grams/100 Watts is expected. When Castor bean is similarly grown using an induction lamp, bar 912 shows that a total amount of dry weight of about 3.25 grams/100 Watts is expected. These values are arrived at by generating normalized total dry weight values (i.e., by dividing the total dry weight values of corresponding bars 808 and 812 by four 4 so that the resulting dry weight values are expressed per 100 Watts of power), and then multiplying the normalized dry weight values by (400/250). As mentioned above, the factor of (400/250) is used because the present invention assumes that for the same distance between an EPS light source and a plant or a plant propagule, an MH lamp, which uses 400 Watts of input power, illuminates with substantially similar PAR value as that achieved with an induction lamp that uses 250 Watts of input power. As a result, based on total amount of dry weight measured using an HPS and an MH (emitting EPS light) lamp, the present invention uses linear interpolation techniques to obtain total amount of dry weight expected from an induction lamp (emitting EPS light), which is substantially similar to its MH counterpart.

The present invention recognizes that for growing both Pharbitis and Castor Bean, EPS light from an induction lamp offers between about 100% and about 150% greater total amount of dry weight than using conventional light sources under the same growing conditions per Watt of electricity required to power the two different types of lamps.

Miniature Rose Plants, a cultivar of *Campanula*, and small species of *Euphorbia* were started from cuttings in 4-inch pots with typical planting medium according to the standard procedure of the commercial nursery where the experiments were conducted. Plants in groups of 12 pots each were placed on wooden benches in a fiberglass greenhouse and watered daily from overhead sprinklers with a low level of added nutrients. At Half Moon Bay, Calif., a coastal location, all the plants were grown under the same conditions with regard to watering, nutrients, pot size, soil/fertilizer composition, humidity, temperature and the like. During plant growth, a 12- to 13-hour day started with 3 to 5 hours of fog, and ended with an additional 2 hours of fog. For these tests, 4 hours of supplemental lighting was supplied, beginning in the morning starting at dawn, and 2 hours just before darkness. The HPS and EPS lights, which was used for supplemental lighting, were arranged approximately 6 feet above the tables at spacing to provide 160 µMol/m$^2$/sec PPFD as measured by a PAR meter at bench height. Photographs and measurements were taken at weekly intervals, and the data reported here was taken at 14 or 16 weeks when the plants would have been placed on the market.

The flower production of Miniature Roses was determined after plants of this variety were grown for 25 days in an experimental fiberglass greenhouse. The plants were grown on a bench in 3 widely spaced groups of 12 plants each (with a "guard row" around each group). One group was under High Pressure Sodium (HPS) light (requiring an input power of about 400 Watts) at 6 foot centers along the bench, 6 feet above the bench to give 160 PAR at bench level. A second group was used as controls with no supplemental light. The third was under Enhanced Spectrum Induction light (requiring an input power of about 250 Watts) at 6 foot centers, 6 feet above the bench to give 156 PAR at bench level. The lights were turned on from 6:30 to 7:30 hours and 19:00 to 23:00 hours each day at a time when sunrise ranged from 7:00 to 7:20 hours and sunset ranged from 22:50 to 22:30 hours during the course of the experiment, and the sky was foggy approximately 4 to approximately 6 hours per day. The percent of total light obtained from the supplemental lights was estimated to be between about 25% and about 35%.

Figure 11:
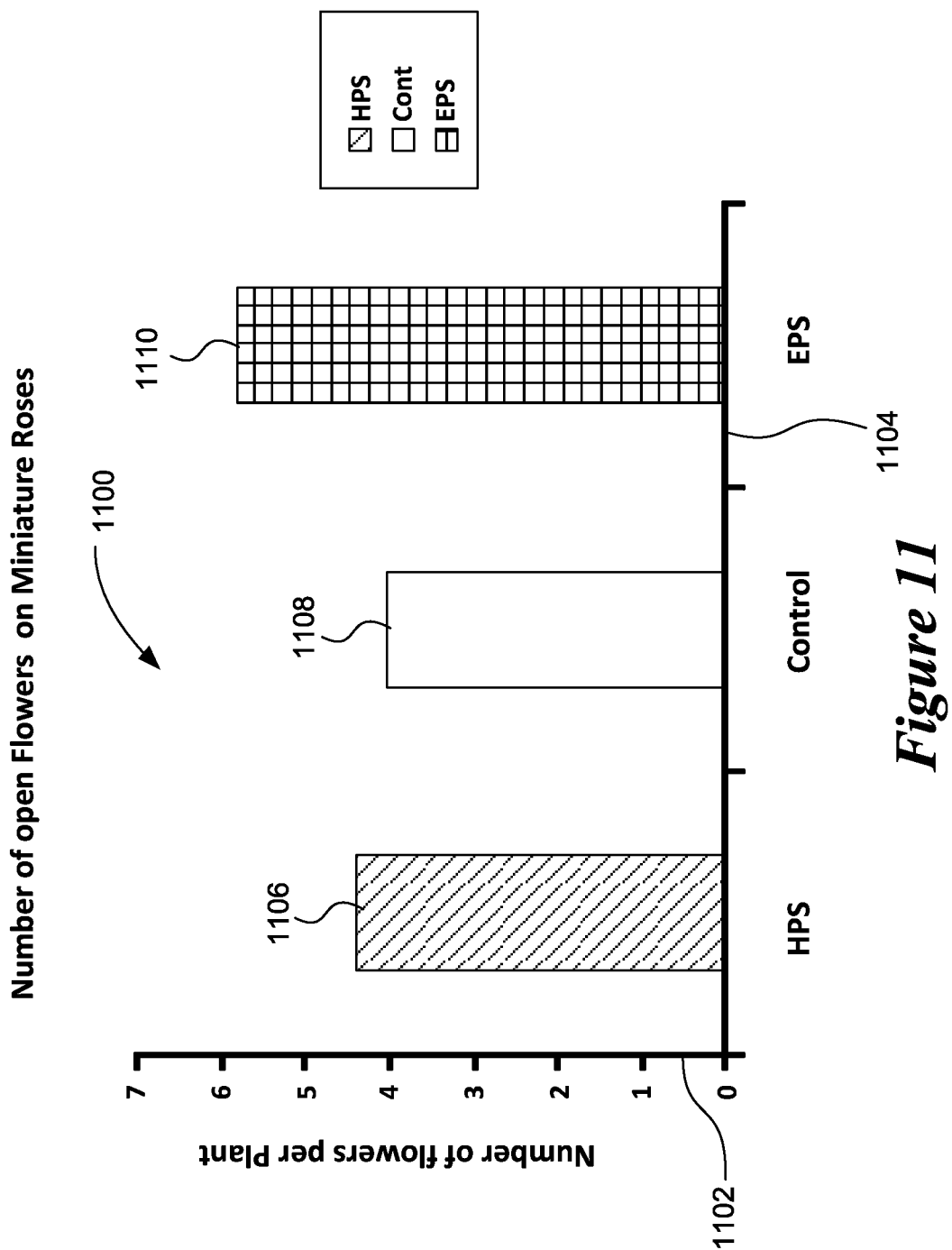
FIG. 11 is a bar graph comparing the number of open flowers obtained per Miniature Rose plant grown in greenhouses with six hours of supplemental illumination with a photosynthetic active radiation ("PAR") of about 180 PAR units under the same temperature and humidity conditions, but two different lighting conditions, i.e., a supplementary EPS obtained from an MH lamp and a supplementary conventional spectrum obtained from an HPS lamp; number of flowers obtained from these two light sources were compared to a control, which did not receive any supplementary lighting.

FIG. 11 shows a bar graph 1100 that presents the number of open flowers on Miniature Roses grown, as describe above. The number of flowers per plant are plotted along y-axis 1102 and the different lamps (i.e., HPS and MH lamps) used for providing supplemental lighting during growth of Miniature Roses are indicated on x-axis 804. According to this figure, bar 1106 shows that a little more than four flowers per plant were obtained when supplemental lighting from an HPS lamp was used. To this end, bar 1106 similarly shows about 4 flowers per plant are obtained when no supplemental lighting was used. Bar 1110 shows that approximately six flowers per plant were obtained when EPS generated from an MH lamp was used to provide supplemental lighting.

Figure 12:
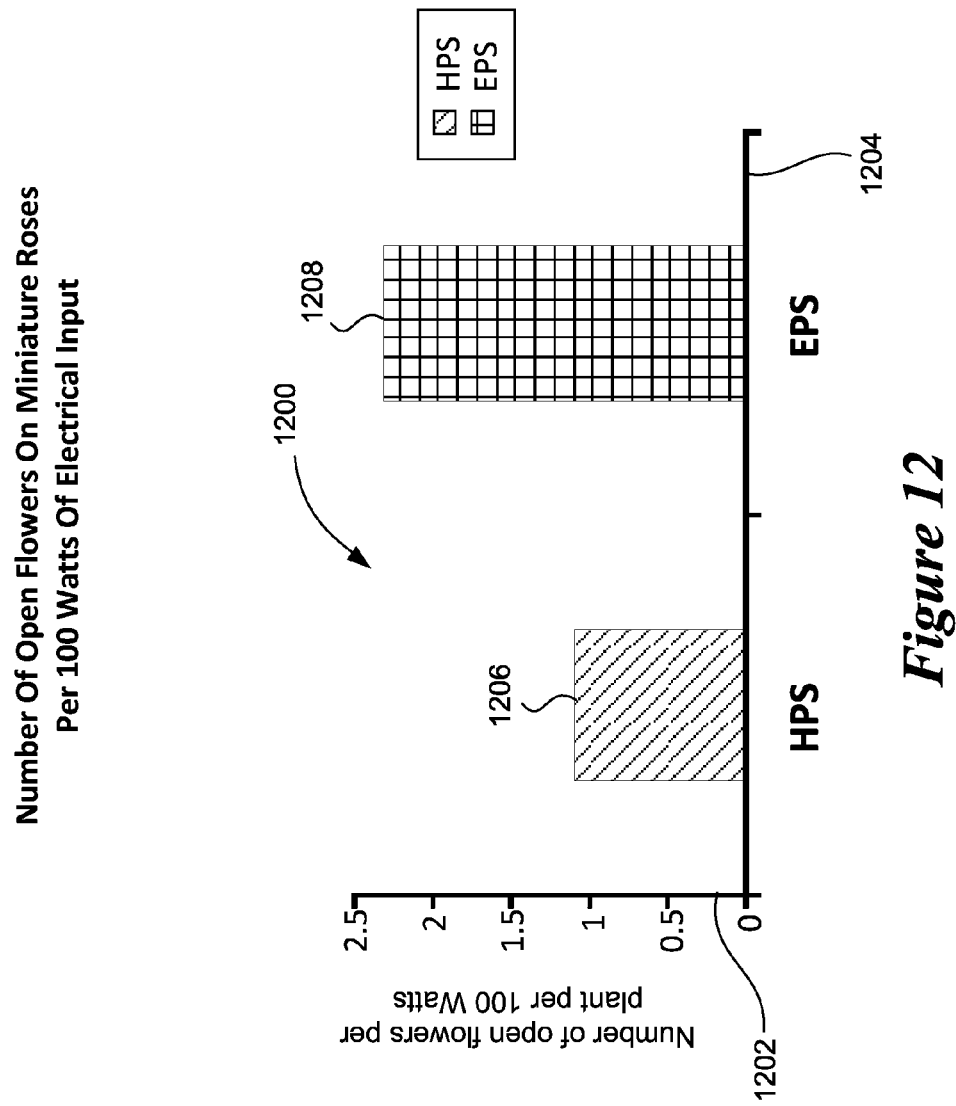
FIG. 12 is a bar graph similar to that shown in FIG. 11, except in FIG. 12, normalized values of number of flowers (i.e., per 100 watts of power) expected from an induction lamp are plotted along the y-axis and the control is not shown.

FIG. 12 is a bar graph similar to that shown in FIG. 11, except in FIG. 12, normalized values of number of open flowers on Miniature Roses (i.e., per 100 watts of input power) are along the y-axis. Furthermore, FIG. 12 presents normalized values expected from an induction lamp (instead of an MH lamp as shown in FIG. 11) that is designed to provide EPS light. X-axis 1204 of FIG. 12 is substantially similar to x-axis 1104 of FIG. 11.

According to FIG. 12, when an HPS lamp, which emits conventional spectrum, is used, bar 1206 shows that a normalized value of number of open flowers on Miniature Roses is about 1. Normalized value of number of open flowers on Miniature Roses for bar 1206 are obtained by dividing the number of open flowers on Miniature Roses of bar 1106 by four 4 so that the resulting values are expressed per 100 Watts of input power.

If an induction lamp is used for growing Miniature Roses, bar 1208 shows that a normalized number of open flowers of about 2.36 is expected. These values are arrived at by generating normalized value of number of open flowers (i.e., by dividing the number of open flowers of corresponding bar 1110 by four 4 so that the resulting number of open flowers are expressed per 100 Watts of input power), and then multiplying the normalized dry weight values by (400/250). As mentioned above, the factor of (400/250) is used because the present invention assumes that for the same distance between an EPS light source and Miniature Roses, an MH lamp, which uses 400 Watts of input power, illuminates with substantially similar PAR value as that achieved with an induction lamp that uses 250 Watts of input power. As a result, based on number of open flowers measured using an HPS and an MH (emitting EPS light) lamp, the present invention uses linear interpolation techniques to obtain these number of open flowers expected from an induction lamp (emitting EPS light).

FIG. 12 demonstrates more than a two-fold increase in the ratio of flower production per 100 Watts of input power. Consequently, the overall improvement in plant performance per Watt is approximately two-fold, thus the expected reduction in electric power use by the inventive light sources in greenhouse or growth chamber applications is at least about 50%.

Based on the results obtained from the experiments described above, the present invention expects that EPS light emitting sources would similarly positively impact harvest index (which refers to the ratio of the harvestable part of a plant, e.g., fruit, flowers and buds, to the non-harvestable part of the plant). The present invention expects values for harvest index, when using EPS light during plant growth, to be between about 80% and about 120% greater than that achieved using conventional light.

In certain preferred embodiments, the present invention provides a light source (e.g. 104 of FIG. 1) for growing a plant (e.g., 106 of FIG. 1) or a plant propagule. The light source includes a power component requiring an amount of input power and a light-emitting component, which is designed to receive the input power from the power component, for illuminating a grow area for a period of time. The input power may be any reasonable value suitable to promote plant growth. Preferably, the input power is a value that ranges between about 250 Watts and about 400 Watts. The grow area in a greenhouse may be between about 2 m$^2$ and about 4 m$^2$ and the grown area in a grow box may be between about 0.75 m$^2$ and about 1.5 m$^2$.

In an operating state of the light source, incident light, including one of the inventive spectral profiles, illuminating the plant or the plant propagule affects photosynthesis to enable plant growth. Inventive spectral profiles (also referred to as "EPS" herein) are defined by a first, a second and a third set of wavelengths as mentioned above. In certain embodiments, inventive light sources may further include a fourth or fifth set of wavelengths, which are also described above. The different sets of wavelengths may be present in the incident light (illuminating the plant or plant propagule) in certain amounts describe above. In one embodiment, inventive light sources include an induction lamp, a metal halide lamp or light emitting diodes that generate EPS light.

As discussed in reference to FIGS. 6-12, photosynthetic productivity, total dry weight and harvest index obtained from inventive spectral profiles is greater than those achieved when the same grow area of the plant or plant propagule is illuminated by another spectral profile that does not include the second set of wavelengths of EPS. In other words, with all other conditions being the same, using EPS light during plant growth provides a greater photosynthetic productivity, total dry weight and harvest index compared to those obtained when light containing conventional spectral profiles (e.g., obtained from a HPS lamp) are used for plant growth. By way of example, values for each of photosynthetic productivity and total dry weight achieved using EPS light is between about 40% per input power and about 200% per input power greater than that achieved using conventional light, such as an HPS lamp. More preferably, values for each of photosynthetic productivity and total dry weight achieved using EPS light is between about 100% per input power and about 150% per input power greater than that achieved using conventional light. As another example, values for harvest index achieved using EPS light is between about 80% and about 120% greater than that achieved using conventional light. As a result, plant enclosures which use inventive light enclosures are preferred over plant enclosures which use conventional counterparts of the inventive light enclosures.

In other embodiments of the present invention, methods of growing a plant or a plant propagule using EPS are provided. In these embodiments, inventive methods include powering an electrically-powered light source with an amount of input power to generate an incident light including EPS. Inventive methods further include illuminating, for a period of time, a growth area of the plant or the plant propagule with the incident light including EPS. The next step of the inventive methods includes achieving, using the incident EPS light, a value for any one of photosynthetic productivity, harvest index and total dry weight that is greater than a value for its counterpart achieved by illuminating the same growth area by another incident light that is produced using the same amount of input power as the EPS incident light, but that does not include the second set of wavelengths of EPS. As a result, advantageously the present invention provides that under the same growing conditions and input power, EPS incident light provides a greater amount of any one of photosynthetic productivity, harvest index and total dry weight than conventional light (e.g., obtained from an HPS lamp).

In certain other embodiments of the present invention, other methods of growing a plant or a plant propagule using EPS are provided. In these embodiments, inventive methods include powering an electrically-powered light source with an amount of input power to generate an incident light including EPS. Inventive methods further include illuminating, for a period of time, a growth area of the plant or the plant propagule with the incident light including EPS. The next step of the inventive methods includes achieving, using the incident EPS light, a value for any one of photosynthetic productivity, harvest index and total dry weight that is the same as that obtained for its counterpart by illuminating the same growth area by another incident light that is produced using a greater amount of input power as the EPS incident light, but that does not include the second set of wavelengths of EPS. As a result, the present invention advantageously provides that under the same growing conditions and using a relatively smaller amount of input power, EPS incident light provides the same amount of any one of photosynthetic productivity, harvest index and total dry weight than conventional light (e.g., obtained from an HPS lamp). Thus, EPS incident light improves the inherent efficiency of the lamp for plant or plant propagule growth.

The present invention also recognizes, as discussed above, that if a plant or a plant propagule, grown in natural sunlight, is also subjected to supplementary EPS lighting, then supplementary exposure to EPS lighting enhances plant or plant propagule growth in natural lighting. To this end, the present invention provides methods that include exposing a plant or a plant propagule with natural sun light and providing supplemental light to the plant or the plant propagule by illuminating the plant or the plant propagule to incident light having a first set of wavelengths, a second set of wavelengths, and a third set of wavelengths of EPS light. The exposing step may be carried out for a first period of time and the providing step may be carried out for a second period of time, and the first and the second periods of time add up to a specified day length. In one embodiment of the inventive methods, the specified day length is substantially constant over a number of days, which may occur during anytime of a year. By way of example, a specified day length is between about 12 hours and about 16 hours long.

Although illustrative embodiments of this invention have been shown and described, other modifications, changes, and substitutions are intended. Accordingly, it is appropriate that the appended claims be construed broadly and in a manner consistent with the scope of the disclosure, as set forth in the following claims.

What is claimed is:

1. A method of growing a plant or a plant propagule, comprising:
   obtaining said plant or said plant propagule and an electrically-powered light source;
   powering said electrically-powered light source with an amount of input power to generate an incident light;
   illuminating, for a period of time, a growth area of said plant or said plant propagule with said incident light having a spectral profile defined by a first set of wavelengths, a second set of wavelengths and a third set of wavelengths;
   achieving, using said incident light, a dry weight from growth of said plant or said plant propagule that is greater than that achieved if said growth area of said plant or said plant propagule was grown by illuminating using another incident light with said amount of input power for substantially said period of time, and said another incident light includes said first set of wavelengths and said third set of wavelengths, but does not include said second set of wavelengths;
   wherein said dry weight refers to a weight of partial or entire grown said plant or said plant propagule obtained after drying such that grown said plant or said plant propagule is substantially free of moisture, and wherein said first set of wavelengths includes wavelengths that are between about 400 nm and about 470 nm, said second set of wavelengths includes wavelengths that are between about 526 nm and about 570 nm, and said third set of wavelengths includes wavelengths that are between about 626 nm and about 700 nm, and
   wherein said first set of wavelengths comprises between about 12% and about 16% of said light illuminating said plant or plant propagule and said second set of wavelength comprises between about 19% and about 25% of said light illuminating said plant or plant propagule and said third set of wavelength comprises between about 27% and about 35% of said light illuminating said plant or plant propagule.

2. The method of claim 1, wherein said electrically-powered light source is one member selected from a group consisting of an induction lamp, a metal halide lamp and a light-emitting diode ("LED").

3. The method of claim 1, wherein said period of time is a value that is between about 12 weeks and about 16 weeks.

4. The method of claim 1, wherein said input power is a value that ranges between about 250 Watts and about 400 Watts.

5. The method of claim 1, wherein said growth area in a greenhouse is a value that is between about 2 square meters and about 4 square meters.

6. The method of claim 1, wherein said growth area in a growth chamber is a value that is between about 0.75 square meters and about 1.5 square meters.

7. The method of claim 1, wherein said dry weight obtained using said incident light is between about 1.5 and about 2.5 times than that obtained using another incident light with said amount of input power for substantially said period of time.

8. The method of claim 7, wherein said dry weight obtained using said incident light is about 1.9 times than that obtained using said another incident light with said amount of input power for substantially said period of time.

9. The method of claim 1, wherein said spectral profile further comprises a fourth set of wavelengths that includes wavelengths that are between about 471 nm and about 525 nm.

10. The method of claim 9, wherein said fourth set of wavelengths comprises between about 12% and about 17% of said light illuminating said plant or said plant propagule.

11. The method of claim 1, wherein said spectral profile further comprises a fifth set of wavelengths that includes wavelengths that are between about 571 nm and about 525 nm.

12. The method of claim 11, wherein said fifth set of wavelengths comprises between about 15% and about 21% of said light illuminating said plant or said plant propagule.

13. A method of growing a plant or plant propagule, comprising:
obtaining a plant or plant propagule and an electrically-powered light source;
powering said electrically-powered light source with an input power to generate an incident light;
illuminating a growth area of said plant or plant propagule with said incident light having a spectral profile defined by a first set of wavelengths, a second set of wavelengths and a third set of wavelengths;
achieving, using said incident light, a dry weight from growth of said plant or said plant propagule that is substantially same as that achieved if said growth area of said plant or said plant propagule had grown by illuminating using another incident light for substantially said period of time, and said another incident light is generated using a greater amount of said input power than said amount of said input power required to generate said incident and said another incident light includes said first set of wavelengths and said third set of wavelengths, but does not include said second set of wavelengths;
wherein said dry weight refers to a weight of partial or entire grown said plant or said plant propagule obtained after drying such that grown said plant or said plant propagule is substantially free of moisture, and wherein said first set of wavelengths includes wavelengths that are between about 400 nm and about 470 nm, said second set of wavelengths includes wavelengths that are between about 526 nm and about 570 nm, and said third set of wavelengths includes wavelengths that are between about 626 nm and about 700 nm, and
wherein said first set of wavelengths comprises between about 12% and about 16% of said light illuminating said plant or plant propagule and said second set of wavelength comprises between about 19% and about 25% of said light illuminating said plant or plant propagule and said third set of wavelength comprises between about 27% and about 35% of said light illuminating said plant or plant propagule.

14. The method of claim 13, wherein said light source is at least one member selected from a group consisting of an induction lamp, a light emitting diode ("LED") and a metal halide lamp.

15. The method of claim 14, wherein said amount of said input power used for generating said incident light is between about 20% and about 75% of an amount of said input power used for generating said another incident light.

16. The method of claim 15, wherein said amount of said input power used for generating said incident light is between about 40% and about 60% of said amount of said input power used for generating said another incident light.

17. The light source of claim 13, wherein said growth area in a greenhouse is a value that is between about 2 square meters and about 4 square meters.

18. The light source of claim 13, wherein said growth area in a growth chamber is a value that is between about 0.75 square meters and about 1.5 square meters.

19. The method of claim 13, wherein said spectral profile further comprises a fourth set of wavelengths that includes wavelengths that are between about 471 nm and about 525 nm.

20. The method of claim 19, wherein said fourth set of wavelengths comprises between about 12% and about 17% of said light illuminating said plant or plant propagule.

21. The method of claim 13, wherein said spectral profile further comprises a fifth set of wavelengths that includes wavelengths that are between about 571 nm and about 625 nm.

22. The method of claim 21, wherein said fifth set of wavelengths comprises between about 15% and about 21% of said light illuminating said plant or plant propagule.

23. The method of claim 13, wherein said amount of said input power of said light source is between about 250 Watts and about 400 Watts.

* * * * *